Patented Mar. 8, 1932

1,848,131

UNITED STATES PATENT OFFICE

ERNST JÄNECKE, OF HEIDELBERG, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF MIXED CRYSTALS CONTAINING POTASSIUM AND AMMONIUM

No Drawing. Application filed October 18, 1927, Serial No. 227,064, and in Germany November 22, 1926.

This invention relates to the production of mixed crystals of ammonium and potassium in the form of their nitrates or chlorids or both nitrates and chlorids. Hereinafter the term "salts" is intended to comprise only the chlorids and nitrates. Mixed crystals of the said salts often have the advantage of being more stable than the individual components, a feature which renders them particularly valuable in comparison with the latter, as for example for use as fertilizers.

It is known that potassium and ammonium salts will form mixed crystals with one another, but it has been assumed that at low temperatures this is the case to only a limited extent.

I have found however that on the contrary, the formation of mixed crystals of potassium and ammonium salts is also very considerable at low temperatures. When separating out of melts or solutions, potassium chlorid and ammonium chlorid may form a continuous series of mixed crystals. As the temperature falls, an interruption of the series takes place, inasmuch as two kinds of mixed crystals appear. Nevertheless, even at 0° centigrade, mixed crystals are still formed containing up to 6 and over 84 per cent by weight of potassium chlorid. At 50° centigrade mixed crystals containing up to 8 and from 70 per cent of potassium chlorid are formed. Hence the capacity for forming mixed crystals at low temperatures is far greater than hitherto assumed. The nitrates of potassium and ammonium also form mixed crystals to a considerable extent, though, unlike the chlorid compounds, they do not form mixed crystals of any variety of composition at any temperature. At 0° centigrade mixed crystals containing up to about 45 or more than 88 per cent of potassium nitrate are formed, and at 50° centigrade mixed crystals with up to about 50 or more than 85 per cent of potassium nitrate. The mixed crystals which finally merge into pure ammonium nitrate, the potassium nitrate disappearing, have the same crystalline habit (acicular rhombic) as ammonium nitrate between 35° and 85° centigrade, and the mixed crystals which finally merge into pure potassium nitrate have the same crystalline habit (granular rhombic) as the form of potassium nitrate which is stable below 125° centigrade. The formation of these two kinds of mixed crystals ceases at a little above 100° centigrade but there are also formed, above that temperature, mixed crystals of different crystalline habits of ammonium nitrate or potassium nitrate, the proportion of the one salt in the mixed crystals being, however, very small. The present invention relates, so far as the nitrates are concerned, to the mixed crystals of potassium and ammonium nitrate which occur below 100° centigrade.

Basing my work on my aforesaid discoveries, I have now found a new and surprisingly simple process of making mixed crystals containing potassium and ammonium.

The process according to the present invention for the production of mixed crystals containing potassium and ammonium consists in the separation of solutions which are saturated with the nitrates of potassium and ammonium and also either with the corresponding chlorids or with sodium nitrate or with several of these substances with or without sodium chlorid, that is solutions which contain at least four ions, three of which are the potassium ion, the ammonium ion and the nitrate ion, and the fourth of which is either the sodium ion or the chlorid ion, and which are in equilibrium with at least three solid phases from the solid deposit and in the addition of potassium nitrate and/or ammonium nitrate, or the chlorids, or both, and, as desired, the salts of sodium or other metals to the residual solution, and in the removal of the resulting deposit, containing potassium and ammonium salts as mixed crystals. The mother liquor thus obtained may be treated for further utilization with other potassium and/or ammonium salts, and also sodium salts if desired, than those added for the first precipitation, and in this event mixed crystals containing potassium and ammonium are also deposited. The residual liquor may then be subjected again to the whole process ab initio, the operation being thus carried out as a circulatory process. The deposition of the mixed crystals may be effected by simple stirring. It is advisable, however, to first dissolve the added salts as far as possible by warming and to re-cool the resulting liquid to the initial temperature for the purpose of causing the deposition of the mixed crystals.

The process may be applied for example to solutions which contain ammonium, potassium and sodium nitrate in association. If there be added, at a given temperature, to a solution of this kind, which contains more ammonium nitrate than the other salts, an excess of the three nitrates so that the whole does not pass into solution, a mother liquor is obtained in equilibrium with three salts in solid phase. These three substances, however, are not the three salts, ammonium nitrate, potassium nitrate and sodium nitrate, but are mixed crystals, the composition of which depends on the temperature. The mixed crystals in which sodium nitrate predominates contain but little of the other two salts. Conversely, the mixed crystals containing both ammonium and potassium nitrate contain very little sodium nitrate. On the introduction of ammonium nitrate into the mother liquor separated from the solid phases, mixed crystals rich in potassium nitrate are formed, but which, nevertheless, contain more ammonium nitrate than potassium nitrate and the composition of which varies according to the relative proportions of the ammonium nitrate added and of the mother liquor. Through this precipitation the mother liquor becomes poorer in potassium nitrate and richer in ammonium nitrate. The sodium nitrate plays practically no part in the transposition. If potassium nitrate is now added to the resulting mother liquor after the separation of the precipitate, mixed crystals containing more potassium nitrate than ammonium nitrate are formed, but they also contain a little sodium nitrate. The resulting mother liquor has thus undergone a certain modification, and, on addition of ammonium nitrate, may give rise to fresh mixed crystals of the kind first mentioned.

If the mother liquor obtained after the addition of ammonium nitrate be treated with both potassium and sodium nitrate, two kinds of solid phases are produced, one of which consists mainly of sodium nitrate and the other of mixed crystals, with the crystalline habit of potassium nitrate, with ammonium nitrate and a low content of sodium nitrate. By alternate additions of ammonium nitrate on the one hand, and potassium and sodium nitrate on the other, to the liquor, mixed crystals comparatively rich in ammonium nitrate and practically free from sodium nitrate, are obtained in the one case, and mixtures containing sodium nitrate in the other. The composition of both types of mixtures may be extensively modified by varying the quantities and the temperature.

When the chlorids and nitrates of potassium and sodium are present simultaneously, mixed crystals may be formed containing either the chlorids or the nitrates. If, at a given temperature, a solution containing potassium and ammonium as chlorid and nitrate (ammonium nitrate predominating) be treated with an excess of solid ammonium nitrate, ammonium chlorid and potassium nitrate, so that the whole does not pass into solution, a mother liquor will be obtained with these three salts, as solid phase, in the form, not of ammonium nitrate, potassium nitrate and ammonium chlorid, but of three different types of mixed crystals. The addition of ammonium nitrate to the mother liquor furnishes mixed crystals containing ammonium and potassium nitrate. The addition of potassium chlorid to the resulting mother liquor effects the formation of two kinds of mixed crystals, the potassium chlorid undergoing transposition with the ammonium nitrate of the solution and forming two kinds of mixed crystals, the one containing more ammonium chlorid than potassium chlorid, and the other having more potassium nitrate than ammonium nitrate. The addition of ammonium nitrate to the resulting mother liquor again produces mixed crystals of potassium and ammonium nitrate. In this way, by alternating transposition, dual results are obtained, on the one hand homogeneous mixed crystals of potassium-ammonium nitrate, free from chlorine and on the other a mixture of two kinds of mixed crystals in which all four constituents of the solution are contained. The composition depends on the relative amounts of solution and salts employed. This transposition is possible only as the result of the formation of the mixed crystals with the addition of ammonium nitrate. It would not occur if the usual hypothesis were correct that the nearly pure salts are solid phases of the solution. The resulting salts form excellent fertilizer salts.

A similar process may also be carried out with the chlorids of potassium, ammonium and sodium. Sodium chlorid mixed with potassium chlorid may also be employed in association with ammonium nitrate. The sodium and the chlorine will then be chiefly found again in the second solid-phase mixture, whereas the first consists almost entirely of potassium and ammonium nitrate.

Soluble phosphatic salts may also be employed, in addition to the chlorids and/or nitrates of ammonium and potassium, in which case valuable saline mixtures containing phosphates are obtained.

The following examples will further illustrate the nature of the said invention which however is not limited thereto.

Example 1

250 kilograms of ammonium nitrate are introduced after the solid phase has been separated off into 1 cubic metre of liquor (at ordinary temperature) which is incapable of taking up any further quantity of ammonium nitrate, potassium nitrate and sodium nitrate, and which has the specific gravity of about 1.5, the solution being then warmed, whereupon all the ammonium nitrate dissolves. On being re-coiled to the initial temperature, 250 kilograms of mixed crystals are deposited, containing about 65 per cent of ammonium nitrate and 35 per cent of potassium nitrate. After removing the mixed crystals, the mother liquor is treated with a mixture of 200 kilograms of potassium nitrates and 50 kilograms of sodium nitrate, which dissolve on warming. On re-cooling to the initial temperature, 350 kilograms of mixed salts are deposited, containing 35 per cent of ammonium nitrate, the remainder consisting of potassium and sodium nitrate. The composition of the resulting mother liquor has undergone little alteration and it may be treated anew with the same salts and mixed salts in the order specified.

Example 2

1 cubic metre of liquor at ordinary temperature, which is incapable of taking up any more of a saline mixture of potassium nitrate, ammonium nitrate and ammonium chlorid, and from which the deposit has been removed, is treated with 300 kilograms of ammonium nitrate which is dissolved therein by warming. On cooling, mixed crystals containing 25 per cent of potassium nitrate are deposited, the crude salt containing only 2½ per cent of chlorine. After removing the mixed crystals, the mother liquor is treated with 150 kilograms of potassium chlorid which is dissolved therein by warming. On cooling, 350 kilograms of a mixture of salts are deposited, composed of mixtures of mixed crystals of the nitrates and chlorids with a content of about 9 per cent of $NH_4$ and 13½ per cent of Cl. In this case also, the composition of the resulting liquor differs little from the original solution so that the liquor can be used again.

Example 3

1 cubic metre of liquor, at ordinary temperature, which is incapable of taking up any more of a mixture of the nitrates of potassium, ammonium and sodium, and ammonium chlorid, is separated from the deposit and treated with 300 kilograms of ammonium nitrate, which is dissolved therein by warming. On cooling 400 kilograms of mixed crystals are deposited, containing 75 per cent of ammonium nitrate. After removing the mixed crystals, 100 kilograms of potassium chlorid and 50 kilograms of sodium chlorid are added to the mother liquor and dissolved by warming. On cooling to the initial temperature, 225 kilograms of a mixture of various mixed crystals of chlorids and nitrates, containing about 34 per cent of Cl and 19½ per cent of $NH_4$, are deposited. The resulting mother liquor is approximately the same as the original solution and may be used in the same manner.

What I claim is:

1. The process of producing mixed crystals containing potassium and ammonium, which comprises separating any deposit from an aqueous solution, which contains at least four ions, three of which are the potassium ion, the ammonium ion and the nitrate ion, and the fourth of which is selected from the group consisting of the sodium ion and the chlorid ion, and which solution is in equilibrium with at least three solid phases, adding at least one solid salt selected from the group consisting of the nitrates and chlorids of potassium and ammonium, warming the solution for dissolving the added salt, cooling the solution, and finally removing the resulting deposit comprising mixed crystals containing potassium and ammonium.

2. A modification of the process of claim 1, which comprises starting from a solution as defined in claim 1 and containing the sodium ion, and also adding a solid salt selected from the group consisting of sodium nitrate and sodium chlorid in addition to at least one solid salt selected from the group consisting of the nitrates and chlorids of potassium and ammonium.

3. In the process of producing mixed crystals containing potassium and ammonium as claimed in claim 1, the step of adding to the solution after the mixed crystals have been separated therefrom, at least one solid salt selected from the class consisting of the nitrates and chlorids of potassium, ammonium and sodium, other than that employed for the first precipitation of mixed crystals, removing the mixed crystals now formed, and employing the mother liquor again ab initio in the process.

4. In the process of producing mixed crystals as claimed in claim 1, the step of also adding solid phosphates to the saturated solution in addition to at least one solid salt selected from the group consisting of the nitrates and chlorids of potassium and ammonium.

In testimony whereof I have hereunto set my hand.

ERNST JÄNECKE.